United States Patent
Chen et al.

(10) Patent No.: US 10,439,480 B2
(45) Date of Patent: Oct. 8, 2019

(54) ACTUATOR AND LINEAR MOTION MODULE

(71) Applicant: Delta Electronics, Inc., Taoyuan (TW)

(72) Inventors: Po-Tzu Chen, Taoyuan (TW); Chi-Wen Chung, Taoyuan (TW); En-Yi Chu, Taoyuan (TW); Chun-Hsiu Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 449 days.

(21) Appl. No.: 15/204,331

(22) Filed: Jul. 7, 2016

(65) Prior Publication Data

US 2017/0331358 A1 Nov. 16, 2017

(30) Foreign Application Priority Data

May 13, 2016 (TW) .............................. 105114834 A

(51) Int. Cl.
| | |
|---|---|
| *H02K 41/02* | (2006.01) |
| *H02K 11/21* | (2016.01) |
| *H02K 1/34* | (2006.01) |
| *H02K 3/04* | (2006.01) |
| *H02K 41/03* | (2006.01) |
| *H02K 11/215* | (2016.01) |

(52) U.S. Cl.
CPC .............. *H02K 41/02* (2013.01); *H02K 1/34* (2013.01); *H02K 3/04* (2013.01); *H02K 11/21* (2016.01); *H02K 41/031* (2013.01); *H02K 11/215* (2016.01)

(58) Field of Classification Search
CPC ............................... H02K 41/02; H02K 11/21
USPC ....................................................... 310/12.19
See application file for complete search history.

(56) References Cited

U.S. PATENT DOCUMENTS

| | | | | |
|---|---|---|---|---|
| 7,633,188 B2 * | 12/2009 | Kitade | ................... | H02K 41/03 310/12.23 |
| 7,659,641 B2 * | 2/2010 | Miyamoto | ............. | H02K 41/03 310/12.01 |

\* cited by examiner

*Primary Examiner* — Jianchun Qin

(74) *Attorney, Agent, or Firm* — Muncy, Geissler, Olds & Lowe, P.C.

(57) ABSTRACT

An actuator is provided, including a fixed assembly and a movable assembly. The fixed assembly includes a coil module, a base, a first screwing member, and a linear rail. The first screwing member passes through the base and the linear rail, and the linear rail is positioned on the base. The movable assembly includes a U-shaped back board having an inner space, a first magnetic module, a second magnetic module aligned with the first magnetic module, and a sliding block. The first and second magnetic modules are disposed on the U-shaped back board and accommodated in the inner space. The coil module is disposed between the first magnetic module and the second magnetic module. The sliding block is positioned on the U-shaped back board in the inner space, and slidably connected to the linear rail.

15 Claims, 10 Drawing Sheets

ACTUATOR AND LINEAR MOTION MODULE

CROSS REFERENCE TO RELATED APPLICATIONS

The present application is based on, and claims priority from, Taiwan Patent Application No. 105114834, filed on May 13, 2016, the disclosure of which is hereby incorporated by reference herein in its entirety.

BACKGROUND OF THE INVENTION

Field of the Invention

The application relates in general to an actuator, and in particular, to an actuator having a linear rail and a position detector.

Description of the Related Art

A conventional actuator/linear motor usually comprises a tubular linear motor or a U-shaped linear motor. The magnetic field of the tubular linear motor is open, and as a result interference can easily occur when using a plurality of tubular linear motors. Therefore, the driving force is usually enhanced by using a plurality of U-shaped linear motors.

However, a guiding mechanism, a position sensing mechanism, and a weight member should additionally be disposed when the U-shaped linear motors are arranged. The large space is thereby occupied, and the number of U-shaped linear motors cannot be immediately adjusted as required.

BRIEF SUMMARY OF INVENTION

To address the deficiencies of conventional products, an embodiment of the invention provides an actuator, including a fixed assembly and a movable assembly. The fixed assembly includes a coil module, a base, a first screwing member, and a linear rail. The first screwing member passes through the base and the linear rail to position the linear rail onto the base. The movable assembly includes a U-shaped back board having an inner space, a first magnetic module, a second magnetic module aligned with the first magnetic module, and a sliding block. The first and second magnetic modules are disposed on the U-shaped back board and accommodated in the inner space. The coil module is disposed between the first magnetic module and the second magnetic module. The sliding block is positioned on the U-shaped back board in the inner space, and slidably connected to the linear rail.

The aforementioned actuator can further comprise a position detector, a sensing object, a second screwing member, and an elastic member. The position detector is positioned on the fixed assembly. The sensing object is positioned on the movable assembly and corresponds to the position detector. The second screwing member passes through the base and the linear rail. The elastic member connects the fixed assembly to the movable assembly. Furthermore, the longitudinal axis of the first screwing member can be perpendicular or parallel to that of the coil in the coil module.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the actuator are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Figure 1A:
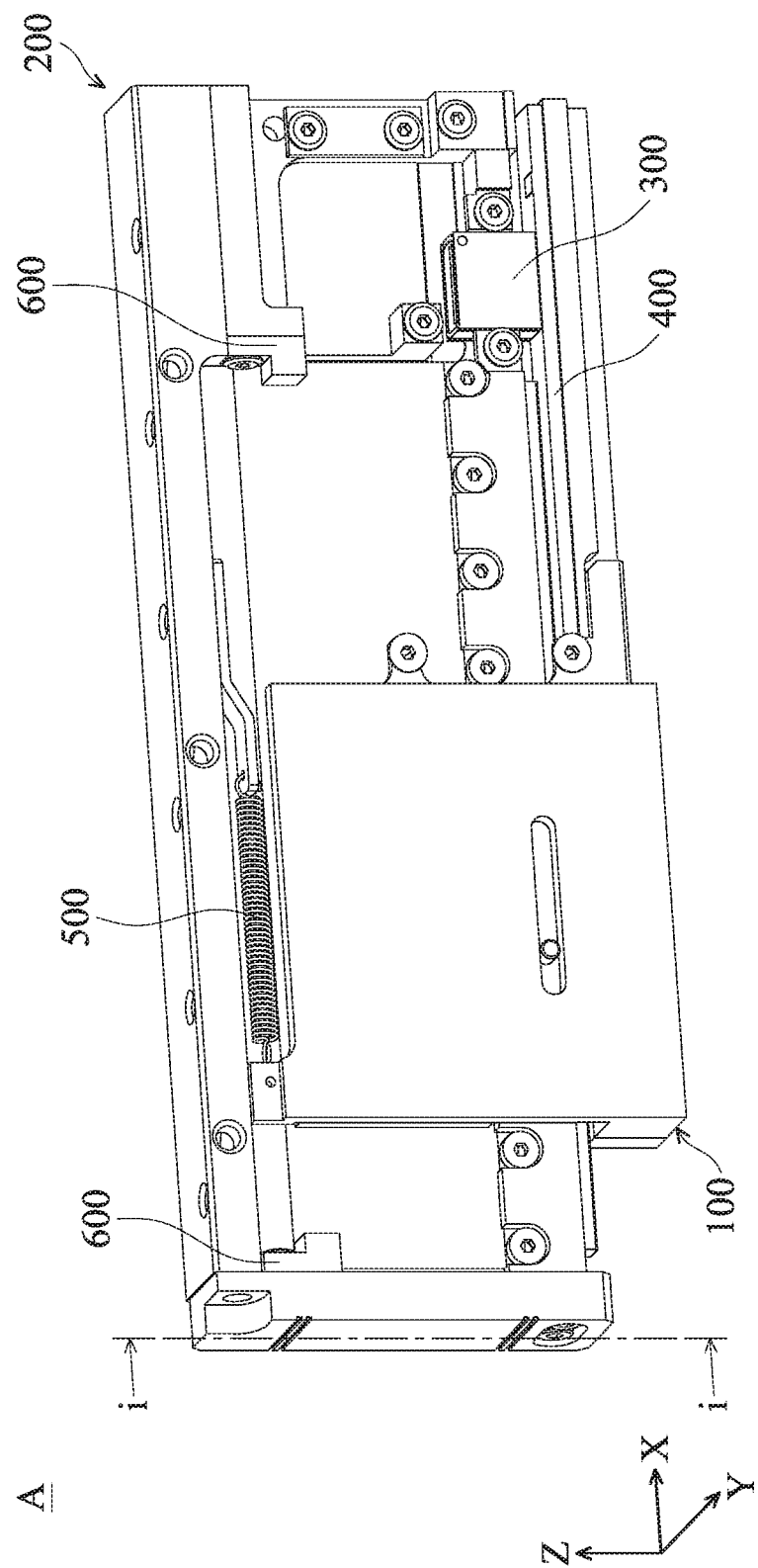
FIG. 1A is a schematic diagram of an actuator according to an embodiment of the invention.
Figure 1B:
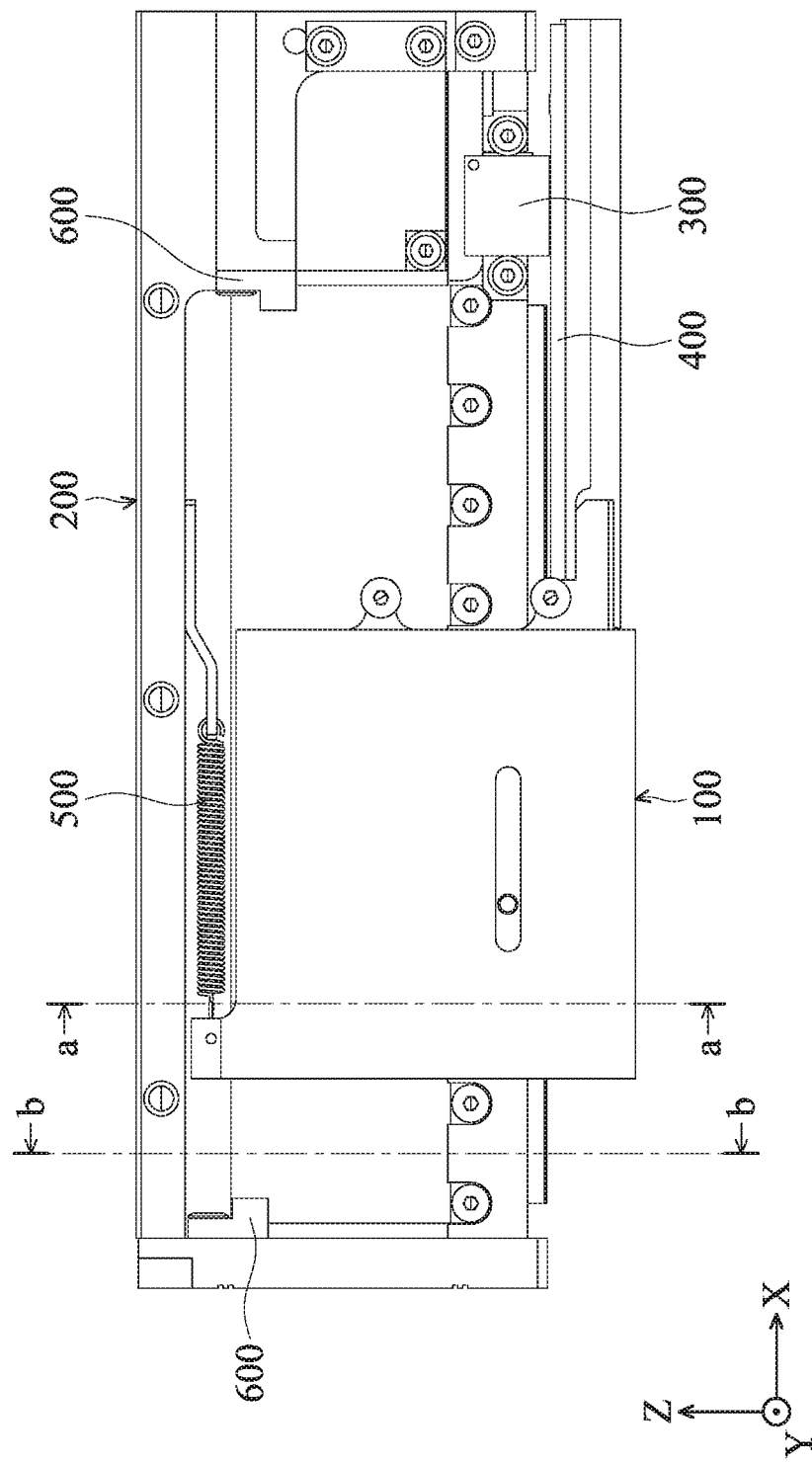
FIG. 1B is a front view of an actuator according to an embodiment of the invention.

First, referring to FIGS. 1A and 1B, an actuator A in an embodiment of the invention primarily comprises a movable assembly 100, a fixed assembly 200, a position detector 300, a sensing object 400, an elastic member 500, and at least one cushion member 600. The movable assembly 100 is connected to the fixed assembly 200, and is slidable along the X axis relative to the fixed assembly 200.

The position detector 300 can be an optical encoder, an infrared sensor, a Hall sensor, a magnetoresistance effect sensor (MR sensor), a giant magnetoresistance effect sensor (GMR sensor), or a tunneling magnetoresistance effect sensor (TMR sensor). When an optical encoder or an infrared sensor is used as the position detector 300, the sensing object 400 can be an optical ruler or a reflective sheet. When a Hall sensor, a magnetoresistance effect sensor, a giant magnetoresistance effect sensor, or a tunneling magnetoresistance effect sensor is used as the position detector 300, the sensing object 400 can be a magnet.

As shown in FIGS. 1A and 1B, the elastic member 500 connects the movable assembly 100 and the fixed assembly 200 to prevent the movable assembly 100 from falling from the fixed assembly 200. The cushion member 600 is fixed on the fixed assembly 200 to prevent the movable assembly 100 from colliding into the fixed assembly 200. In this embodiment, the elastic member 500 can comprise a spring (such as an extension spring), and the cushion member 600 can comprise soft material.

Figure 2:
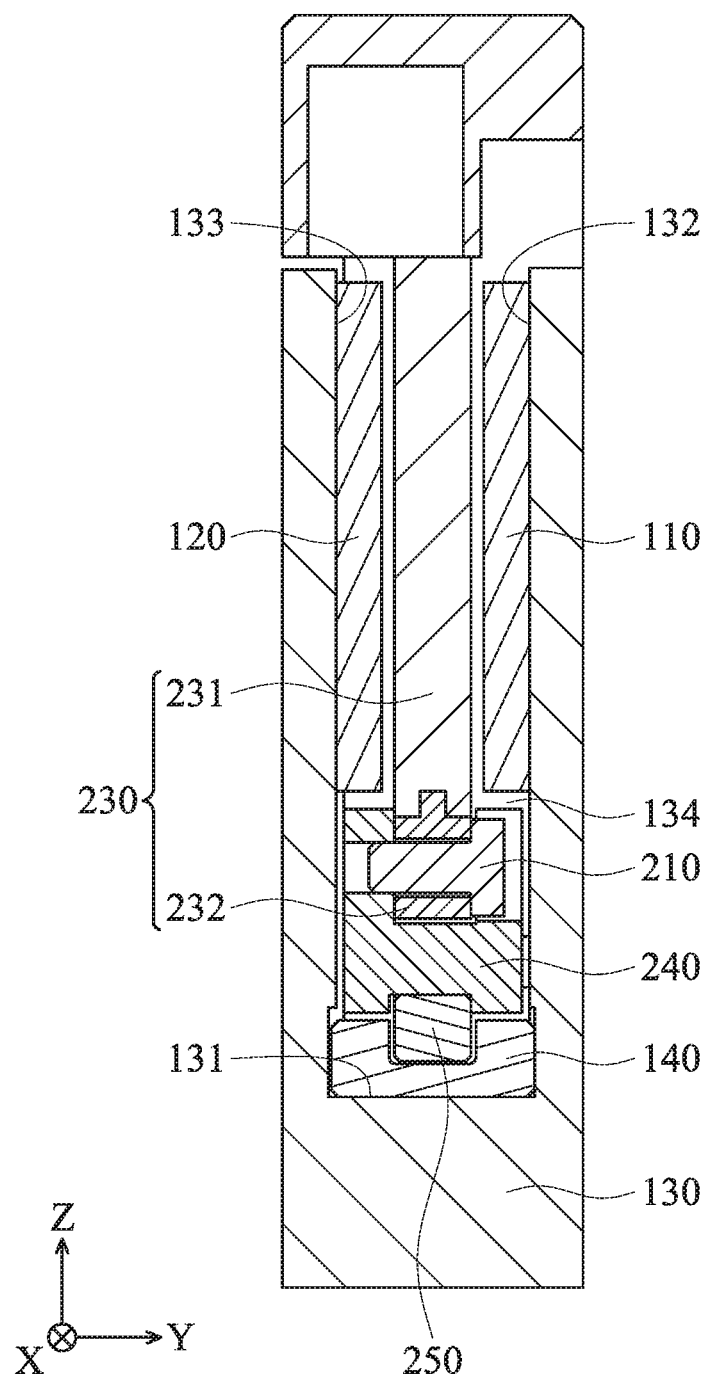
FIG. 2 is a cross-sectional view taken along line a-a in FIG. 1B.
Figure 3:
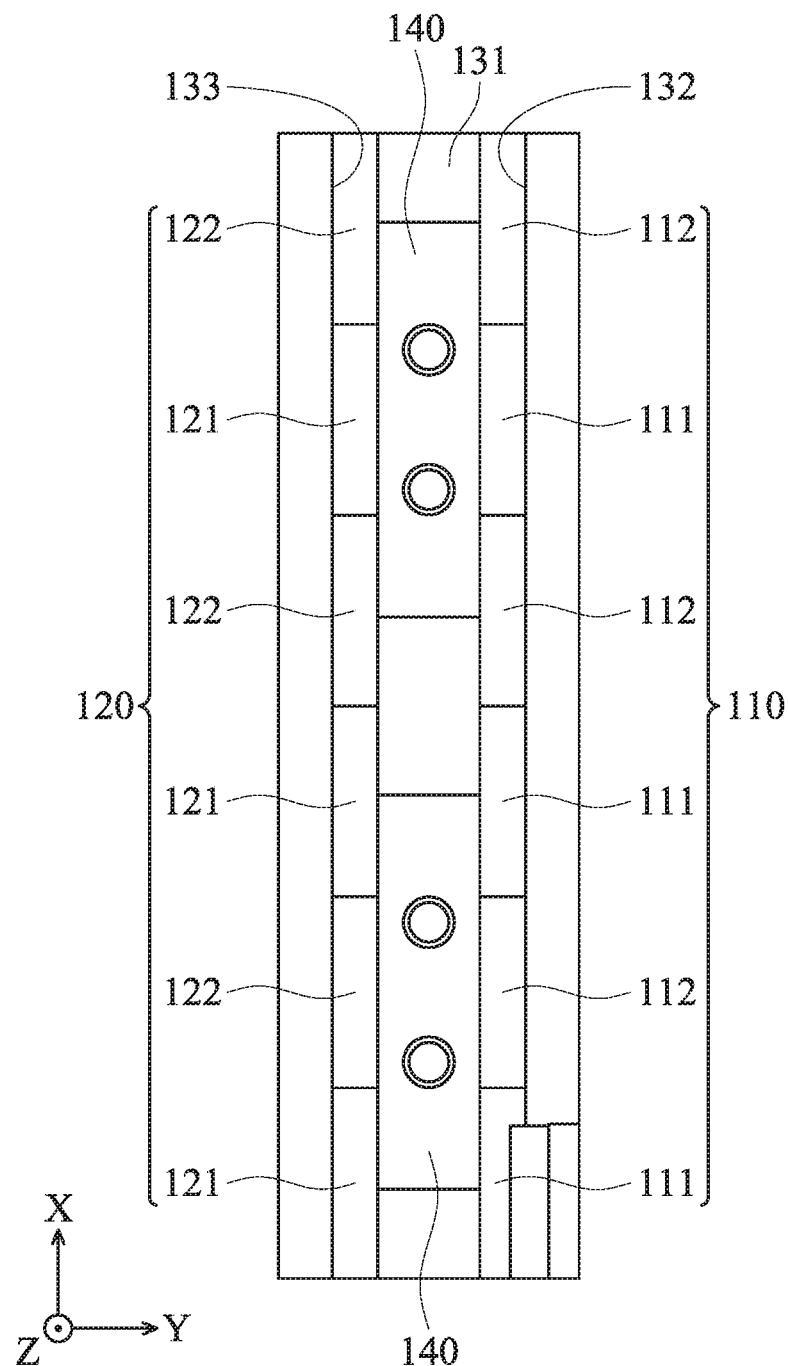
FIG. 3 is a top view of a U-shaped back board according to an embodiment of the invention.

FIG. 2 is a cross-sectional view taken along line a-a in FIG. 1B, and FIG. 3 is a top view of the movable assembly 100. As shown in FIGS. 2 and 3, the movable assembly 100 comprises a first magnetic module 110, a second magnetic module 120, a U-shaped back board 130, and at least one sliding block 140. The U-shaped back board 130 has a bottom surface 131 and two sidewalls 132 and 133 connecting to the bottom surface 131, and an inner space 134 is formed between the sidewalls 132 and 133. The sliding block 140 is positioned on the bottom surface 131. The first magnetic module 110 and the second magnetic module 120 are respectively disposed on the sidewalls 132 and 133. The first magnetic module 110, the second magnetic module 120, and sliding block 140 are accommodated in the inner space 134.

It should be noted that the first magnetic module 110 comprises a plurality of first magnetic members 111 and 112 arranged in the staggered arrangement, and the second magnetic module 120 comprises a plurality of second magnetic members 121 and 122 arranged in the staggered arrangement. The first magnetic members 111 are aligned with the second magnetic members 121, and the first magnetic members 112 are aligned with the second magnetic members 122. The N pole of the first magnetic members 111 and the N pole of the second magnetic members 121 face the same direction, the N pole of the first magnetic members 112 and the N pole of the second magnetic members 122 face the same direction, and the N pole of the first magnetic members 111 and the N pole of the first magnetic members 112 face in opposite directions. For example, in this embodiment, the N pole of the first magnetic members 111 and the N pole of the second magnetic members 121 face the Y axis direction, and the N pole of the first magnetic members 112 and the N pole of the second magnetic members 122 face the −Y axis direction.

Figure 4A:
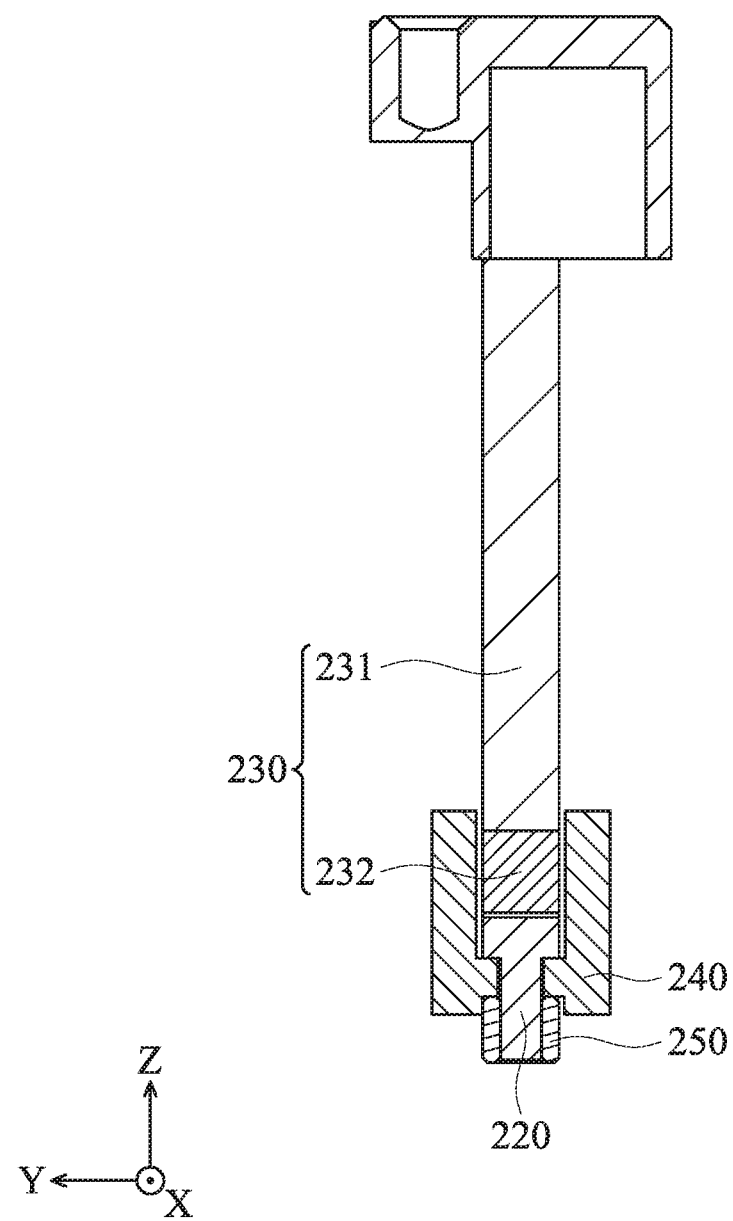
FIG. 4A is a cross-sectional view taken along line b-b in FIG. 1B.
Figure 4B:
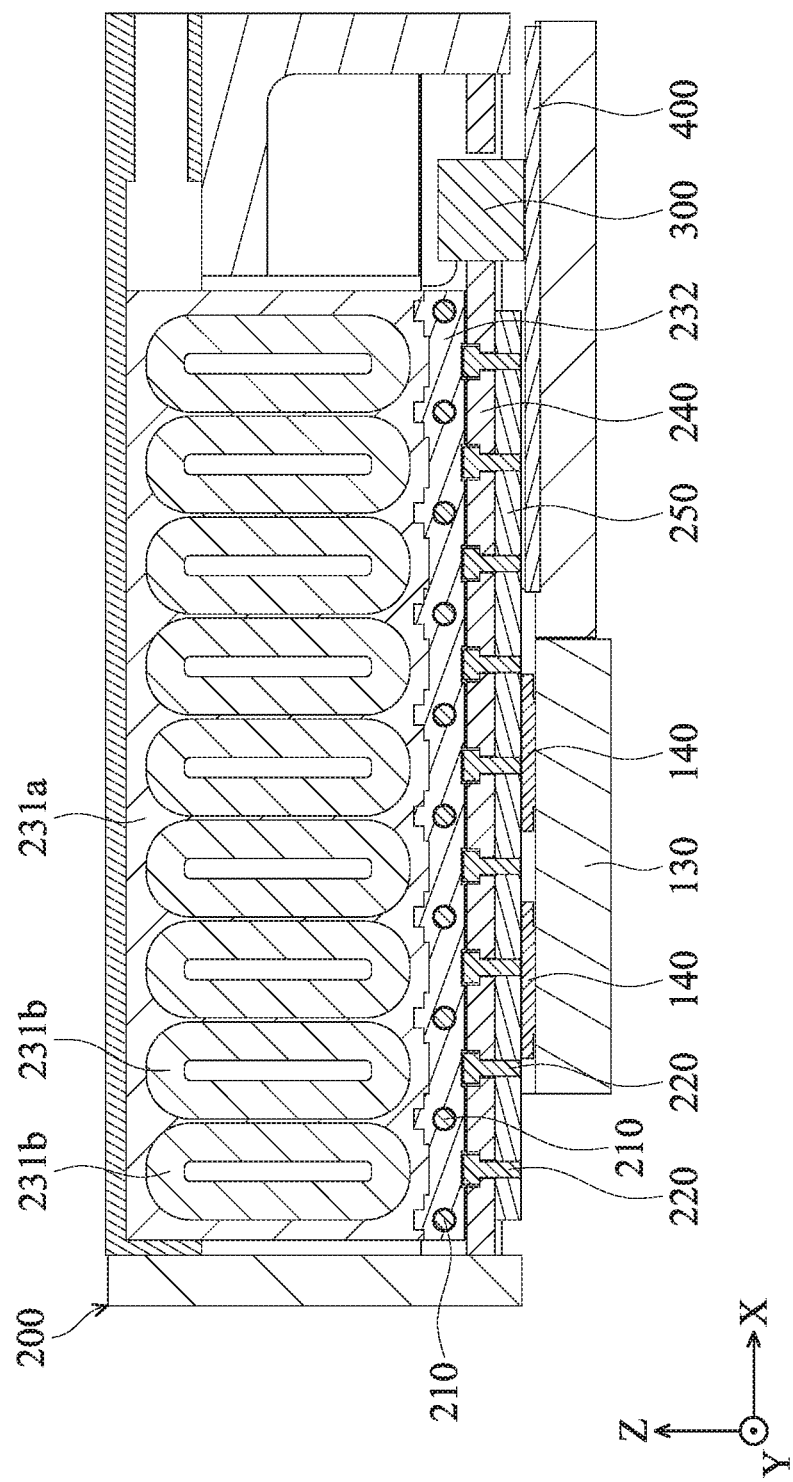
FIG. 4B is a cross-sectional view taken along line i-i in FIG. 1A.
Figure 5:
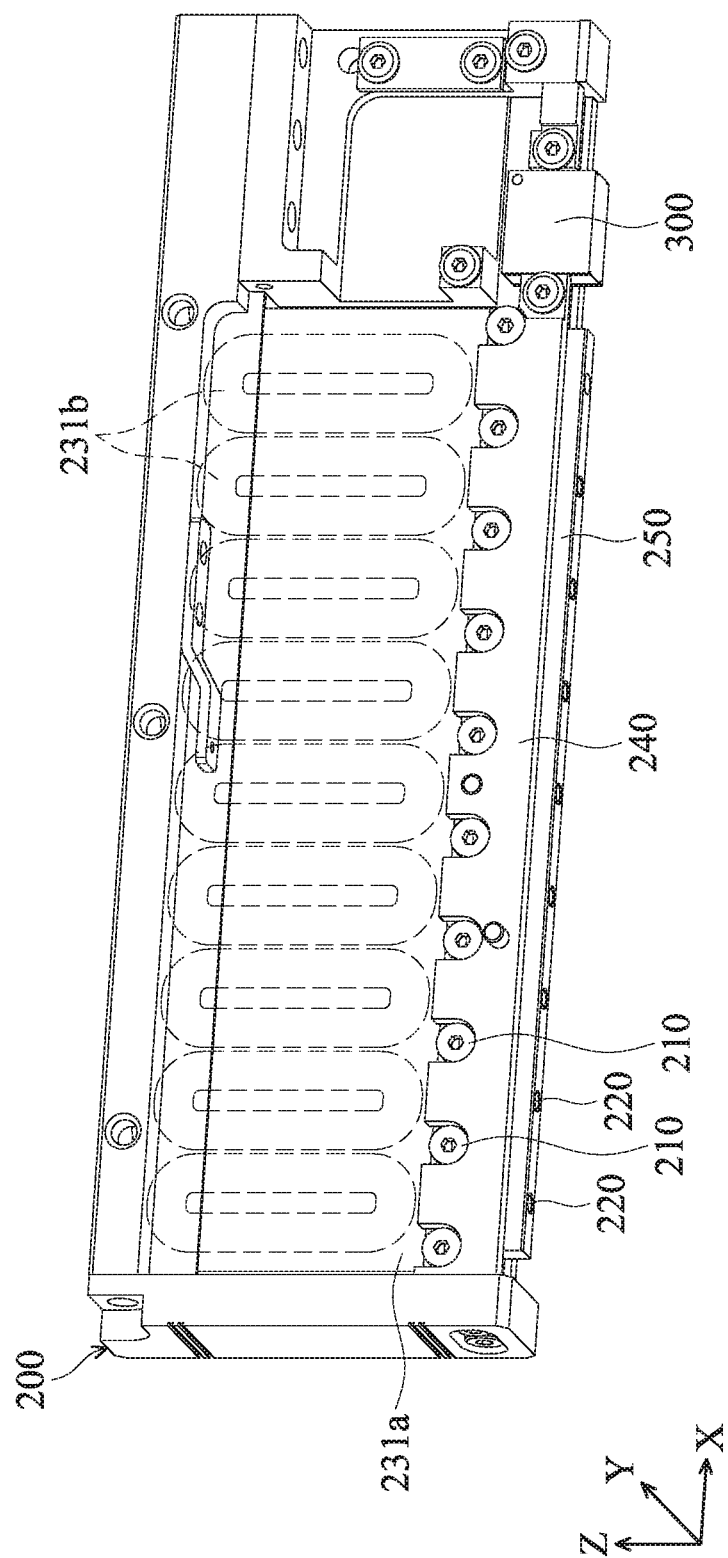
FIG. 5 is a schematic diagram of a fixed assembly according to an embodiment of the invention.

FIG. 4A is a cross-sectional view taken along line b-b in FIG. 1B, FIG. 4B is a cross-sectional view taken along line i-i in FIG. 1A, and FIG. 5 is a schematic diagram of a fixed assembly 200. Referring to FIGS. 2, 4A, 4B, and 5, the fixed assembly 200 comprises at least one first screwing member 210, at least one second screwing member 220, a coil module 230, a base 240, and a linear rail 250. The coil module 230 is formed by a main body 231 and a connecting part 232, wherein the connecting part 232 is connected to the main body 231. The main body 231 can comprise an epoxy 231a and a plurality of coils 231b. The epoxy 231a covers the coils 231b, and the longitudinal axis of the coil 231b extends along the Z axis.

As shown in FIG. 2, the first screwing member 210 laterally passes through the base 240 and the connecting part 232 for positioning the base 240 on the connecting part 232 of the coil module 230. In other words, the longitudinal axis of the first screwing member 210 is perpendicular to that of the coil 231b in this embodiment.

In this embodiment, the rigidity of the connecting part 232 exceeds that of the main body 231 (epoxy 231a). For example, the connecting part 232 can comprise aluminum, magnesium, or an alloy thereof. Thus, the base 240 can be stably positioned onto the coil module 230. Furthermore, in this embodiment, the main body 231 and the connecting part 232 are integrally formed in one piece, and so the connecting mechanism for connecting the main body 231 and connecting part 232 can be omitted. In some embodiments, when the actuator A carries a light object, the main body 231 and the connecting part 232 can be made of the same material.

As shown in FIGS. 4A and 4B, the second screwing member 220 can pass the base 240 and the linear rail 250 to fix the linear rail 250 on the base 240. In this embodiment, the actuator A comprises a plurality of first screwing members 210 and a plurality of second screwing members 220, and the first screwing members 210 and the second screwing members 220 are arranged in the staggered arrangement (FIG. 4B). Therefore, the linear rail 250 can be steadily connected to the coil module 230. In some embodiments, the number of the first screwing member 210 and the second screwing member 220 can be adjusted as required.

Referring to FIG. 2, when the movable assembly 100 is connected to the fixed assembly 200, the sliding block 140) is slidably connected to the linear rail 250, and the coil module 230 is accommodated in the inner space 134 and disposed between the first magnetic module 110 and the second magnetic module 120. When the current flows through the coil module 230, the movable assembly 100 can be driven to move along the X axis direction or the −X axis direction relative to the fixed assembly 200.

Furthermore, as shown in FIGS. 1A and 1B, the positions of the cushion members 600 correspond to the ends of the linear rail 250 for restricting the moving region of the movable assembly 100.

Figure 6:
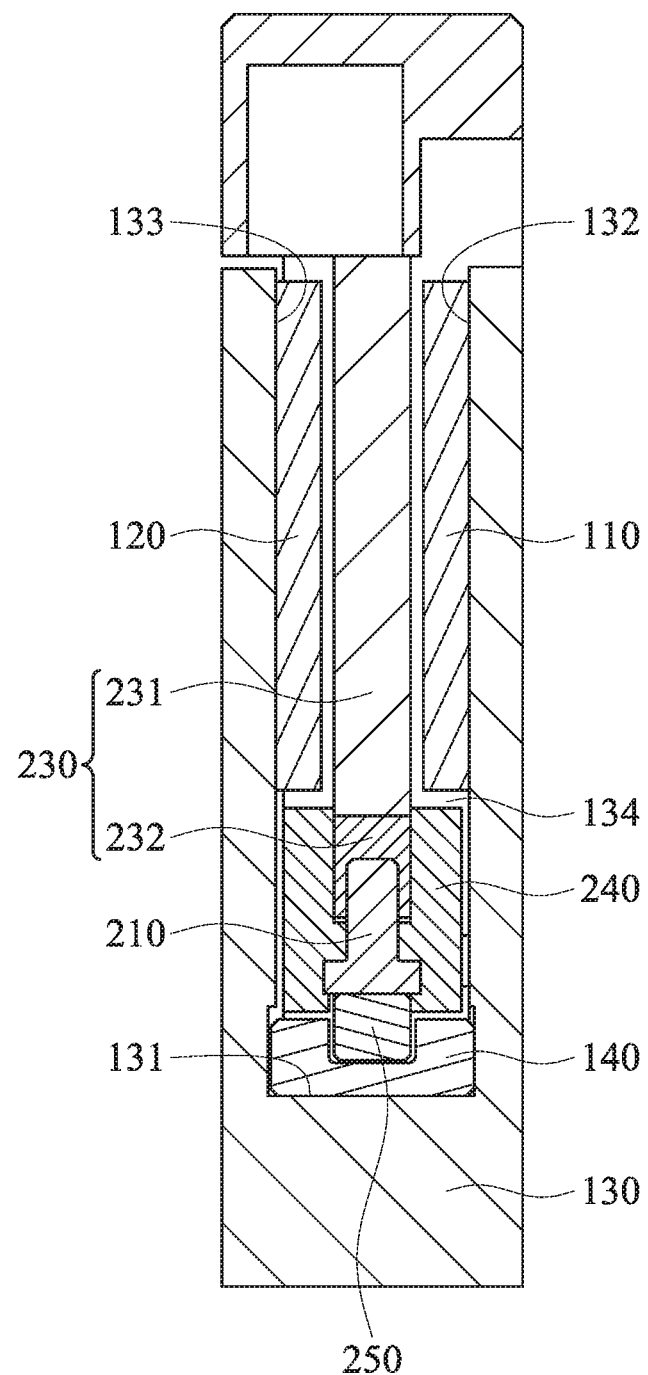
FIG. 6 is a schematic diagram of an actuator according to another embodiment of the invention.

FIG. 6 is a schematic diagram of an actuator A according to another embodiment of the invention. In this embodiment, the first screwing member 210 passes through the base 240 and the connecting part 232 from the bottom to the top to position the base 240 on the connecting part 232 of the coil assembly 230. That is, the longitudinal axis of the first screwing member 210 is parallel to that of the coil 231b. Therefore, exposure of the first screwing member 210 can be avoided, and an artistic and integrated appearance can be achieved.

Figure 7:
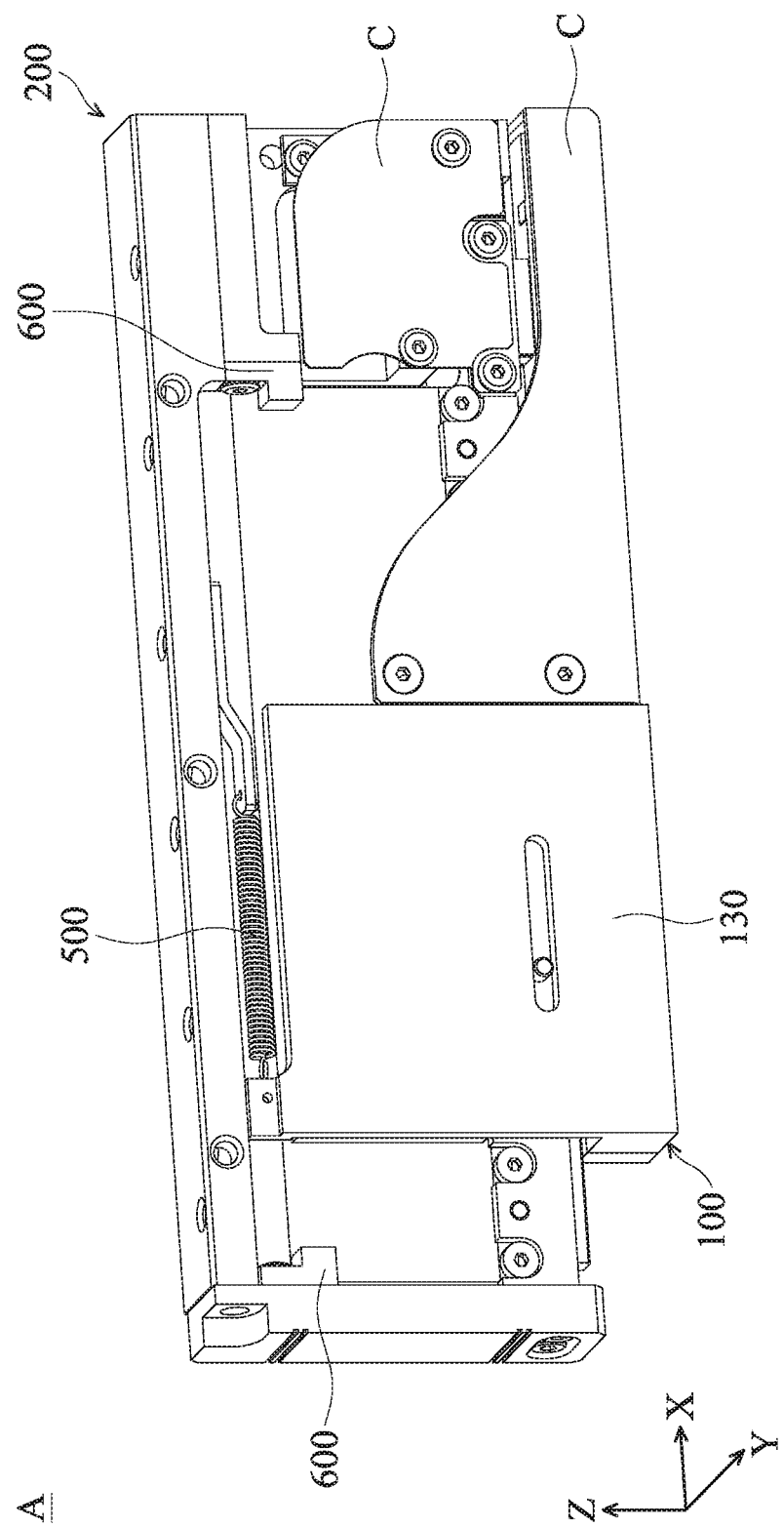
FIG. 7 is a schematic diagram of an actuator according to another embodiment of the invention.

As shown in FIG. 7, in another embodiment, an actuator A can further comprise a plurality of housings C positioned on the movable assembly 100 and the fixed assembly 200, and cover the sensing object 400 and the position detector 300. This can prevent measurement errors of the position detector 300 and the sensing object 400 due to the influence of the external environment. In this embodiment, the surface of the housing C is aligned with, or does not protrude from, the surface of the U-shaped back board 130, and a plurality of actuators A can be easily disposed.

Figure 8:
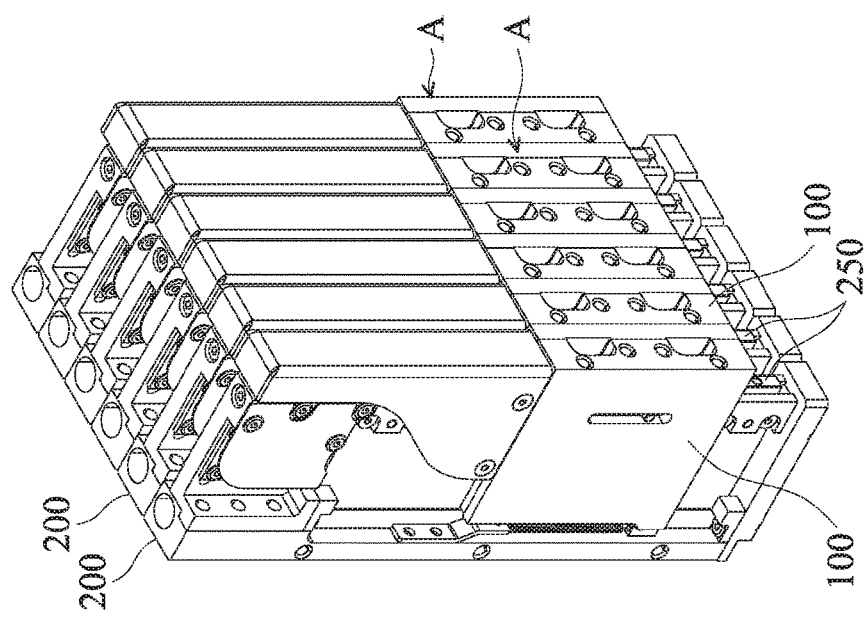
FIG. 8 is a schematic diagram of a linear motion module according to an embodiment of the invention.

Referring to FIG. 8, a linear motion module according to an embodiment of the invention comprises a plurality of actuators A. The actuators are adjacent to each other, and the linear rails 250 of the actuators are parallel to each other. The width of the fixed assembly 200 exceeds or is the same as that of the movable assembly 100. Thus, the user can move the object using a plurality of actuators A, and a large driving force can be provided. Furthermore, when each of the actuators A is in a different position, the position detector 300 and the sensing object 400 on each actuator A can detect the position individually.

In summary, an actuator is provided. Because of the linear rail and the sliding block disposed in the inner space of the actuator, the position detector, and the sensing object that corresponds to the position detector, the user can directly add or remove the actuator when using the linear motion module formed by a plurality of actuators. Convenience of use can thus be achieved.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:
1. An actuator, comprising:
 a fixed assembly, comprising:
  a coil module;
  a base;
  a first screwing member, passing through the base and the coil module; and
  a linear rail, positioned on the base; and a movable assembly, comprising:
- a U-shaped back board, having an inner space;
- a first magnetic module, disposed on the U-shaped back board and accommodated in the inner space;
- a second magnetic module, disposed on the U-shaped back board and accommodated in the inner space, wherein the first magnetic module is aligned with the second magnetic module, and the coil module is disposed between the first magnetic module and the second magnetic module; and
- a sliding block, positioned on the U-shaped back board, disposed in the inner space, and slidably connected to the linear rail.

2. The actuator as claimed in claim 1, wherein the actuator further comprises a position detector and a sensing object, the position detector is positioned on the fixed assembly, and the sensing object is positioned on the movable assembly and corresponds to the position detector.

3. The actuator as claimed in claim 1, wherein the coil module comprises a plurality of coils, and the longitudinal axis of the first screwing member is perpendicular to that of the coils.

4. The actuator as claimed in claim 1, wherein the coil module comprises a plurality of coils, and the longitudinal axis of the first screwing member is parallel to that of the coils.

5. The actuator as claimed in claim 1, wherein the fixed assembly further comprises at least one second screwing member, passing through the base and the linear rail.

6. The actuator as claimed in claim 5, wherein the fixed assembly further comprises a plurality of first screwing members and a plurality of second screwing members, and the first screwing members and the second screwing members are arranged in a staggered arrangement.

7. The actuator as claimed in claim 1, wherein the coil module comprises a main body and a connecting part connected to the main body, and the main body and the connecting part are integrally formed in one piece.

8. The actuator as claimed in claim 1, wherein the actuator further comprises an elastic member, connected the fixed assembly and the movable assembly.

9. The actuator as claimed in claim 8, wherein the elastic member comprises a spring.

10. The actuator as claimed in claim 1, wherein the actuator further comprises a cushion member, disposed on the fixed assembly and corresponding to an end of the linear rail.

11. The actuator as claimed in claim 1, wherein the actuator further comprises at least one housing, covering the position detector and the sensing object.

12. The actuator as claimed in claim 11, wherein the surface of the housing is aligned with the surface of the U-shaped back board.

13. The actuator as claimed in claim 1, wherein the coil module comprises a main body and a connecting part connected to the main body, and the rigidity of the connecting part exceeds that of the main body.

14. The actuator as claimed in claim 1, wherein the coil module comprises a plurality of coils and an epoxy, and the epoxy covers the coils.

15. A linear motion module, comprising:
- a plurality of actuators as claimed in claim 1, wherein the width of the fixed assemblies of the actuators exceed that of the movable assemblies, and the linear rails are parallel to each other.

* * * * *